Patented May 25, 1948

2,442,068

UNITED STATES PATENT OFFICE 2,442,068

SULFUR-CHLORIDE TREATED BUTYL RUBBER AS TIE-GUM

Ralph F. Wolf, Westfield, and William J. Sparks, Elizabeth, N. J., assignors to Standard Oil Development Company, a corporation of Delaware No Drawing. Application May 26, 1942, Serial No. 444,582

4 Claims. (Cl. 154—46)

This invention relates to rubber-like materials, relates particularly to means for attaching together different kinds of rubber-like materials; and relates especially to a tie gum composition made up of a synthetic polymer of an iso-olefin with a diolefin in combination with sulphur chloride.

Considerable difficulty has been experienced in fastening together two different kinds of rubber, and this difficulty has been especially troublesome in fastening together natural rubber and the synthetic rubbery material prepared as a polymer of an iso-olefin such as isobutylene with a diolefin such as butadiene, isoprene, piperylene, dimethyl butadiene or the like as polymerized at temperatures ranging from $-10°$ C. to $-150°$ C. or lower by the use of a dissolved Friedel-Crafts catalyst.

In the prior art, it has been customary to use interposed plies of mixtures of the respective rubber-like compounds which are to be plied or combined together, and different kinds of rubber are readily united in this way. However, mixtures of natural rubber with the iso-olefin-diolefin interpolymer are of relatively low physical strength and tend to blister when cured, and while such a mixed ply will serve for some purposes, the strength is undesirably low for other purposes, especially for the attaching of an olefinic polymer tread to a rubber tire carcass.

The present invention is based upon the discovery that while natural rubber and the olefinic polymers cannot be cured together, and either do not adhere at all, or adhere so poorly that they can be pulled apart by hand with a very few pounds of pull, natural rubber adheres strongly to the olefinic polymers which have been pretreated with sulfur chloride. Also the normal polymer adheres strongly to the sulfur chloride treated polymer; and the sulfur chloride treated polymer itself has a good tensile strength, a good elongation, and a good flexure resistance.

Thus, an object of the invention is to ply together two different types of rubbery or rubber-like materials, and especially to ply together and unite natural rubber and an iso-olefinic-diolefinic interpolymer.

Other objects and details of the invention will be apparent from the following description:

The polymer material of this invention is preferably prepared by the procedure shown in the co-pending application, Serial No. 300,336, filed in the name of Robert M. Thomas and William J. Sparks, now United States Patent No. 2,356,128. In outline, the procedure for preparing the polymer consists in preparing a mixture of an iso-olefin such as isobutylene in the proportion of from 70 to 99 parts with a diolefin in the proportion of 30 to 1 parts; suitable diolefins being butadiene, isoprene, pentadiene, dimethyl butadiene, cyclopentadiene or other conjugated diolefins. The mixture of isobutylene and conjugated diolefin is then cooled to a relatively low temperature, preferably below $-50°$ C., and preferably by the application to the mixture of a refrigerant such as solid carbon dioxide, or ethylene (which is the preferred refrigerant-diluent), or such other diluent-refrigerants as liquid methane, especially in admixture with liquid propane or liquid ethane, or, under suitable conditions, external cooling may be used. In addition, various diluents may be used such as butane, ethyl or methyl chloride and the like. If solid carbon dioxide is used, it is preferably present in substantial excess, usually 2 or 3 times by weight of the amount of mixed olefins. To this mixture of olefins and diluent-refrigerant, there is then added a solution of an active halide catalyst such as aluminum chloride, titanium chloride, or uranium chloride dissolved in an inert, low-freezing, solvent such as ethyl or methyl chloride or carbon disulfide or other similar low-freezing, non-complex forming solvent. The catalyst solution is preferably applied to the rapidly stirred olefin-containing mixture in the form of a fine mist or spray onto the rapidly agitated surface of the olefin-containing mixture. The polymerization proceeds rapidly to yield a slurry or mass of the polymer in the residual diluent-refrigerant.

The polymerization reaction is preferably continued until from 50% to 95% of the olefins present have reacted. When this stage of reaction is reached, the reaction is desirably quenched by mixing the polymerization material with a combined oxygen-containing substance such as an alcohol, a ketone or an acid, or an alkaline agent such as caustic or carbonate solution or ammonia or other similar quenching agent. The polymer is then preferably brought up to room temperature and in so doing the diluent, the refrigerant, the catalyst solvent and the unreacted olefins are volatilized and the decomposition products of the active metal halide catalyst substance are removed by washing. This washing is conveniently conducted in a Werner-Pfleiderer type of kneading machine, but it may be conducted in the Banbury type or mill or on the open rolls or merely by prolonged soaking in a churn or other simple washing equipment.

The polymer is then preferably dried and is then ready for the next step of the present invention.

The materials above-described are the preferred materials. However, this polymer is not limited to these materials as such, but for the iso-olefin, there may be substituted for the isobutylene an isoamylene such as

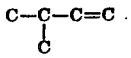

or an isohexylene. Other higher iso-olefins are also usable, but they require more potent catalysts. For the diolefin, substantially any diolefin having the formula

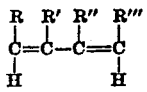

in which R, R', R'' and R''' may be hydrogen or any alkyl substituent from about 1 to 6 carbon atoms is satisfactory. These diolefins are the preferred form, but the polymer is not necessarily limited to these conjugated diolefins, but non-conjugated diolefins may also be used, although the polymers prepared with non-conjugated diolefins tend to be much less soluble, or wholly insoluble in solvents.

The preferred catalyst above given is a solution of aluminum chloride in ethyl or methyl chloride or carbon disulfide. Alternatively propyl chloride is usable as a catalyst solvent, provided that the solution of aluminum chloride is prepared at temperatures below 0° C., and the catalyst solution is not allowed to reach a temperature above 0° C. In some instances, even higher alkyl halides such as butyl chloride may be used.

Similarly, the preferred embodiment of the polymer for sulfur chloride treatment is prepared from a major proportion of the iso-olefin with a minor proportion of the diolefin, but the invention is not to be limited to these proportions, since a useful polymer is obtainable when the proportion of diolefin is as high as 90 to 95 parts with from 10 to 5 parts of the iso-olefin. Such a polymer prepared from a mixture in these proportions is similarly reactive with sulfur chloride, and is similarly useful as a tie-gum substance.

The raw polymer as above prepared is then treated with sulfur chloride preferably by one or the other of two different methods. It may be treated with sulfur chloride in solution as is pointed out in application No. 409,906, now United States Patent No. 2,417,093, filed September 6, 1941, for Sparks and Kellog. In conducting this step, 100 parts of the above-described interpolymer of isobutylene with butadiene were cut into small fragments and submerged in 800 parts of petroleum naphtha. This mixture was allowed to stand until a homogeneous dispersion or solution of the polymer was obtained. Then 20 parts (on the amount of polymer in solution) of sulfur monochloride were added, and the mixture was refluxed for about 10 minutes at a temperature of about 85° C. During this refluxing treatment a substantial quantity of hydrogen chloride was evolved and driven out from the solution. At the end of the 10 minutes of refluxing, the reflux condenser was removed and a standard condenser substituted, and the unreacted sulfur chloride and naphtha were distilled off, leaving behind a solid residue of the sulfur chloride treated polymer. The solid polymer was then compounded according to to the following recipe:

| | Parts |
|---|---|
| Sulfur chloride treated polymer | 100 |
| Zinc oxide | 5 |
| Stearic acid | 5 |
| Sulfur | 3 |
| Tuads (tetra methyl thiuram disulfide) | 1 |

This compound was prepared upon the open rolls by first milling the sulfur-monochloride-treated polymer until a good plasticity was obtained at a temperature of approximately 120° C. Then the zinc oxide, the stearic acid and the sulfur were added. The mill was then cooled to about 80° C. and the Tuads added rapidly. This compound, when removed from the mill, is the raw material for the present invention. It is preferably sheeted out on calendar rolls to appropriate thickness for use as a tie-ply.

Alternatively, the sulfur-chloride, treated polymer may be prepared directly upon the roll mill as shown in co-pending application Serial No. 408,466, filed August 27, 1941, for Sparks and Thomas. In this alternative procedure, the polymer prepared as above-described is mixed in the cold with sulfur monochloride, preferably upon the open roll mill, or in the Banbury mixer or even in the Werner-Pfleiderer mixer. The material is then milled hot, that is, at a temperature of about 100° C. on a closely adjusted roll mill. During this milling, considerable quantities of hydrogen chloride are evolved. The milling is preferably continued until substantially all of the hydrogen chloride is driven out, this requiring from 10 to 30 minutes of milling. The material may be cooled on the mill and then, or at a later date, it may be compounded with appropriate additional substances.

A suitable compounding recipe consists of:

| | Parts |
|---|---|
| Sulfur chloride treated polymer | 100 |
| "Channel Gas Black" | 50 |
| Zinc oxide | 5 |
| Stearic acid | 3 |
| Sulfur | 3 |
| Tuads (tetramethyl thiuram disulfide) | 1 |

This recipe is conveniently prepared by incorporating the successive substances into the polymer on the open mill in a manner much like that in which rubber compounding is accomplished. The compounding may be conducted upon the hot mill up to the point of addition of the Tuads, but the mill is preferably cooled to a temperature well below 100° C. before the Tuads is added.

This material is an alternative raw material for the present invention. It also is preferably sheeted out into an appropriate form for use as a tie-ply.

In practicing the invention, the desired rubber structure is prepared, and the desired iso-olefinic-diolefinic polymer structure is likewise prepared and the two assembled together with an interposed ply of the sulfur-chloride-treated iso-olefinic-diolefinic tie-gum compound. The assembled structure is then cured, preferably in a mold under pressure, or under a cloth or fabric wrapping, to maintain the proper relationship.

In the preparation of such structures as automobile tires, in which the carcass is prepared from fabric and natural rubber with an attached iso-olefinic-diolefinic polymer tread, the carcass structure is first assembled in the usual way, the polymer tread is preferably extruded in appropriate form, and the tie-gum ply is prepared as above-described. The three members are then assembled in a suitable mold and cured for an appropriate time under suitable conditions of temperature and pressure. It is desirable that the accelerators used in the rubber carcass be the less powerful type, and it is desirable that a sulfurization aid be used with the polymeric compound, in order that the curing times of the polymeric tread stock, of the tie-gum; and of the rubber carcass be approximately equal. It may be noted that the sulfur-chloride-treated tie gum serves as a barrier to prevent the diffusion of the more active sulfurization aid from the tread stock into the rubber carcass and prevents it functioning there as an accelerator. This factor makes it possible to cure all three compounds at once, even though the tie-ply is previously partly cured by the sulfur chloride treatment.

In preparing the rubber carcass, a convenient compounding recipe for the rubber is as follows:

| | Parts |
|---|---|
| Smoked sheets | 75 |
| Amber crepe | 25 |
| Agerite Resid D (polymerized dimethyl dehydroquinoline) | 0.5 |
| Pine tar | 1.0 |
| Zinc oxide | 5.0 |
| Kalite #1 (finely divided $CaCO_3$ treated with stearic acid) | 15 |
| Sulfur | 2.75 |
| Captax (mercaptobenzo thiazole) | 0.75 |

Cured for 30 minutes at 30 lbs. steam (274° F.).

Similarly, the iso-olefinic-diolefinic tread stock is conveniently compounded according to the following recipe:

| | Parts |
|---|---|
| Isobutylene-isoprene polymer | 100 |
| Zinc oxide | 5 |
| Stearic acid | 3 |
| Channel black | 60 |
| Sulfur | 1.5 |
| Tuads | 1.0 |

Cured for 60 minutes at 60 lbs. steam (307° F.).

The invention is not limited to tires, but is useful wherever it is desired to fasten together two different kinds of rubber-like substances for any type of structure. It is applicable to rubber buffer pads generally, including engine mountings, floor tiles and shock absorbers in general. It is particularly advantageous for hose structures in which the extremely high abrasion resistance and flexure resistance of the polymer is utilized as a jacket on the outside of the hose. It is similarly useful for flexible power cables, such as for elevator controls, quarry power lines to portable machinery and the like. It is particularly advantageous for divers' dress and for many other purposes which may be obvious to one skilled in the art.

The comparative improvement by this procedure in comparison with previous tie-gum procedures is shown by the fact that the best available tie-gum prepared from mixtures of natural rubber and the olefinic-diolefin polymer has a tensile strength limited to about 450 lbs. per square inch, which is too low for some purposes. In contrast, the present sulfur chloride-treated polymer has a tensile strength of from 1600 lbs. to 2,000 lbs. per square inch; values amply high for almost any plying purpose.

For testing purposes, a series of compounds were prepared according to the following table:

| | Compound | | | | |
|---|---|---|---|---|---|
| | A | B | C | D | E |
| Olefin-diolefin polymer | 100 | | | 100 | 100 |
| Rubber (Smoked sheets) | | 100 | 100 | | |
| Sulfur | 1.5 | 2.75 | 2.75 | 1.5 | 1.5 |
| Tuads | 1.0 | | | | 1.0 |
| Captax | | | 1.00 | | |
| Agerite Powder | | 0.80 | .80 | | |
| Zinc oxide | 5.0 | 12.00 | 12.00 | 5.0 | 5.0 |
| Gastex black | 75.0 | | | 50.0 | 54.0 |
| Stearic acid | 1.5 | 0.75 | 0.75 | 3.0 | 3.0 |
| $SCl_2$ | | | | 5.0 | |

A series of test structures were prepared from layers of these compounds as shown in the following table:

| Layers cured together for 20 minutes at 155° C. | Pounds to separate 1" wide strip at bond |
|---|---|
| A | |
| C | } 0 |
| A | |
| Mixture of A+B(75:25) | } 0 |
| A | 76, 74, 75 (Did not separate. Broke in A) |
| D | |
| C | |
| D | } 90, 102 |

These tests show that an iso-olefin-diolefin tread compound A and a natural rubber carcass compound C when applied in contact with no interposed tie-gum can be pulled apart by hand, the adhesion being practically zero. In comparison, the same polymer tread compound A and a sulfur chloride-treated polymer compound D when cured together could not be pulled apart at the interface, but the stocks themselves broke instead. Similarly, the natural rubber carcass compound C when cured against the sulfur chloride-treated polymeric compound D required a pull of 102 lbs. per lineal inch before separation occurred; this being nearly as good an adhesion as can be obtained between various layers of natural rubber ply compounds.

Standard A. S. T. M. metal adhesion samples were also prepared and tested according to A. S. T. M. designation No. 429–39.

In a typical test, a sample was constructed with plies in the following order:

Sample laminate
1—Steel test piece
2—Ty-Ply R[1] (thin coat)
3—Camelback[2] (½₂" ply)
4—D (½₂" ply)
5—Compound E (½₂" ply)
6—D (½₂" ply)
7—Camelback[2] (½₂" ply)
8—Ty-Ply R[1] (thin coat)
9—Steel test piece

[1] Ty-Ply R is the trade name of rubber to metal adhesive sold by R. T. Vanderbilt Company.
[2] Retread compound sold by U. S. Rubber Co.

This sample was cured for 60 minutes at 155° C. and was then pulled on a testing machine at the rate of one inch per minute. Under these conditions, an adhesion of 380 lbs. per square inch was obtained. In contrast, mixtures of rubber stock and the polymer stock in the proportions of 3—1, 1—1 and 1—3 were used as tie gums between the metal rubber and the iso-olefinic-diolefinic polymer. The test sample showed no adhesion, but the plies separated when removed from the mold.

These test data show the outstandingly improved advantage to be obtained by the use of this material as a tie-gum between the iso-olefinic-diolefinic polymer and natural rubber. Similar advantages, in some instances even more important, are obtained by the use of the same sulfur chloride-treated polymer as a tie-gum ply between such substances as hard rubber and natural rubber, hard rubber and the above-described low temperature polymer of an iso-olefin with a diolefin; with all of these substances and the ethylene polysulfides, known as "Thiokol," with all of these and the polychloroprene known as "neoprene": with all of the above-listed substances and the various butadiene polymers, including the simple butadiene, known as "Buna," the butadiene-acrylonitrile polymer known as "Perbunan," and the butadiene-styrene polymer known as "Buna-S." The tie gum is also highly useful with many of the less elastic plastics, such Bakelite, Celluloid, cellulose acetate, polystyrene, polyvinyl chloride, and many other organic plastic substances.

In the above disclosure, the material is indicated as preferably used in the form of a tie-ply. It is equally useful and similarly effective when used from solution as a cement. For this purpose, the sulfur chloride-treated polymeric material as above-indicated is dissolved in a convenient solvent, which is preferably a light naphtha, such as Varsol or 54° naphtha, although other solvents such as benzol or petroleum ether may also be used. The simple solution of the sulfur chloridal polymer, preferably in a concentration of from 5% to 25%, may be applied as a cement layer between the compounds which are to be fastened together. Alternatively, the materials of either of the above-indicated compounding recipes for the sulfur chloride-treated polymer may be added to this solution and stirred in. In this instance, the cement usually is more satisfactory in greater dilution, since the compounding agents tend to thicken the cement considerably.

Thus the invention provides a new structure made up from a sulfur chloride-treated iso-olefinic-diolefinic polymer interposed between two other plastic or elastic substances.

While there are above disclosed but a limited number of embodiments of the invention, it is possible to produce still other embodiments without departing from the inventive concept herein disclosed, and it is, therefore, desired that only such limitations be embodied upon the appended claims as are stated therein.

The invention claimed is:

1. A flexible, elastic structure comprising in combination a body of cured natural rubber; a body of cured solid elastic hydrocarbon interpolymer of a major proportion of isobutylene with a minor proportion of a polyolefin having 4 to 12, inclusive, carbon atoms per molecule and an interposed tie-gum layer comprising a polymer of a major proportion of isobutylene with a minor proportion of a polyolefin having 4 to 12, inclusive, carbon atoms per molecule, characterized by an elastic limit and a tensile strength at break above 1000 pounds per square inch; the said polymer having in chemical combination therein both sulfur chloride and sulfur.

2. A flexible, elastic structure comprising in combination a body of cured natural rubber, a body of cured elastic hydrocarbon interpolymer of a major proportion of isobutylene with a minor proportion of isoprene and an interposed tie-gum layer comprising a polymer of a major proportion of isobutylene with a minor proportion of isoprene characterized by an elastic limit and a tensile strength at break above 1000 pounds per square inch, the said polymer in the tie-gum layer having in chemical combination therein sulfur chloride.

3. A flexible, elastic structure comprising in combination a body of cured natural rubber, a body of cured elastic hydrocarbon interpolymer of a major proportion of isobutylene with a minor proportion of butadiene and an interposed tie-gum layer comprising a polymer of a major proportion of isobutylene with a minor proportion of butadiene characterized by an elastic limit and a tensile strength at break above 1000 pounds per square inch, the said polymer in the tie-gum layer having in chemical combination therein sulfur chloride.

4. A flexible, elastic structure comprising in combination a body of cured natural rubber, a body of cured elastic hydrocarbon interpolymer of a major proportion of isobutylene with a minor proportion of dimethyl butadiene and an interposed tie-gum layer comprising a polymer of a major proportion of isobutylene with a minor proportion of dimethyl butadiene characterized by an elastic limit and a tensile strength at break above 1000 pounds per square inch, the said polymer in the tie-gum layer having in chemical combination therein sulfur chloride.

RALPH F. WOLF.
WILLIAM J. SPARKS.

REFERENCES CITED

The following references are of record in the file of this patent:

UNITED STATES PATENTS

| Number | Name | Date |
|---|---|---|
| 1,110,451 | McGiehan | Sept. 15, 1914 |
| 1,352,164 | Yelm | Sept. 7, 1920 |
| 1,385,805 | Voorhees | July 26, 1921 |
| 1,979,947 | Krauch et al. | Nov. 6, 1934 |
| 2,213,423 | Wiezevich | Sept. 3, 1940 |
| 2,228,212 | Heintz | Jan. 7, 1941 |
| 2,259,347 | Mallory | Oct. 14, 1941 |
| 2,278,802 | Sarbach | Apr. 7, 1942 |

FOREIGN PATENTS

| Number | Country | Date |
|---|---|---|
| 513,521 | Great Britain | Oct. 16, 1939 |